United States Patent
Alves De Oliveira et al.

(10) Patent No.: US 12,378,167 B2
(45) Date of Patent: Aug. 5, 2025

(54) NPK LIQUID AND SOLID FERTILIZER, OBTAINING PROCESS, FERTILIZING COMPOSITIONS AND USE

(71) Applicants: UNIVERSIDADE FEDERAL DE MINAS GERAIS—UFMG, Belo Horizonte (BR); FERTILITATIS INNOVATIO PESQUISAS LTDA, Belo Horizonte (BR)

(72) Inventors: Luiz Carlos Alves De Oliveira, Belo Horizonte (BR); Jadson Claudio Belchior, Belo Horizonte (BR); Adilson Candido Da Silva, Belo Horizonte (BR); Marcio De Figueiredo Portilho, Niteroi (BR)

(73) Assignees: UNIVERSIDADE FEDERAL DE MINAS GERAIS—UFMG, Belo Horizonte (BR); FERTILITATIS INNOVATIO PESQUISAS LTDA, Belo Horizonte (BR)

( * ) Notice: Subject to any disclaimer, the term of this patent is extended or adjusted under 35 U.S.C. 154(b) by 311 days.

(21) Appl. No.: 17/766,459

(22) PCT Filed: Aug. 28, 2020

(86) PCT No.: PCT/IB2020/058058
§ 371 (c)(1),
(2) Date: Apr. 4, 2022

(87) PCT Pub. No.: WO2021/064489
PCT Pub. Date: Apr. 8, 2021

(65) Prior Publication Data
US 2024/0101490 A1     Mar. 28, 2024

(30) Foreign Application Priority Data
Oct. 4, 2019   (BR) .......................... 1020190209704

(51) Int. Cl.
*C05F 17/60*   (2020.01)
*C05F 1/00*    (2006.01)

(52) U.S. Cl.
CPC .............. *C05F 1/005* (2013.01); *C05F 17/60* (2020.01)

(58) Field of Classification Search
CPC .......... C05F 1/005; C05F 17/60; C05F 1/007; C05F 1/00; C05G 3/00; Y02A 40/20;
(Continued)

(56) References Cited

FOREIGN PATENT DOCUMENTS

BR    PI0402905 A    3/2006
BR    PI0701001 A    10/2008
(Continued)

OTHER PUBLICATIONS

Qi Yao, et al., "Mechanism and Effect of Hydroxyl-Terminated Dendrimer as Excellent Chrome Exhausted Agent for Tanning of Pickled Pelt", Journal of Cleaner Production, vol. 202, pp. 543-552, 2018.
(Continued)

*Primary Examiner* — Jennifer A Smith
(74) *Attorney, Agent, or Firm* — LUCAS & MERCANTI, LLP

(57) ABSTRACT

A process of chemical cleavage of leather or skins containing chromium using sodium, potassium or calcium methylates ($CH_3O^-$) or ethylates ($CH_3CH_2O^-$), producing chromium hydroxide (green paste), ammonium sulfate and liquid fertilizer. The chromium trioxide III ($Cr_2O_3$) obtained was used in the production of Fe—Cr alloy. The liquid fertilizer was applied to strawberry, violet and acerola crops, and can be applied to other types of crops. The fertilizer is also compatible with pesticides, being able to compose a composition containing fertilizer and pesticide or even used to obtain products containing fertilizers and pesticides, which
(Continued)

allow application in a single step, exempting the process in the field A solid NPK fertilizer formulation obtained by combining N recovered from waste and homogeneously mixed with K and P salts.

6 Claims, 1 Drawing Sheet

(58) Field of Classification Search
CPC .......... Y02W 30/50; C14C 3/32; C01C 1/242; C01G 37/033
See application file for complete search history.

(56) References Cited

FOREIGN PATENT DOCUMENTS

| | | | |
|---|---|---|---|
| BR | PI1000015 | A2 | 1/2013 |
| BR | PI1100438 | A2 | 4/2013 |
| BR | 102012024904 | A2 | 8/2014 |
| BR | 102013014252 | A2 | 12/2015 |
| BR | 102015028735 | A2 | 3/2016 |
| BR | 102016011859 | A2 | 4/2017 |
| BR | 102015019187 | A2 | 10/2017 |
| CN | 1464072 | A | 12/2003 |
| CN | 102140154 | A | 8/2011 |
| CN | 108409452 | A | 8/2018 |
| CN | 109354106 | A * | 2/2019 ............ B01J 20/265 |
| RU | 2182931 | C1 | 5/2002 |

OTHER PUBLICATIONS

Yuling Tang, et al., "Effect of Leather Chemicals on Cr(III) Removal From Post Tanning Wastewater", Jalca, vol. 113, pp. 74-80, 2018.
International Search Report for corresponding application PCT/IB2020/058058 dated Nov. 19, 2020 and English translation (7 pages).

* cited by examiner

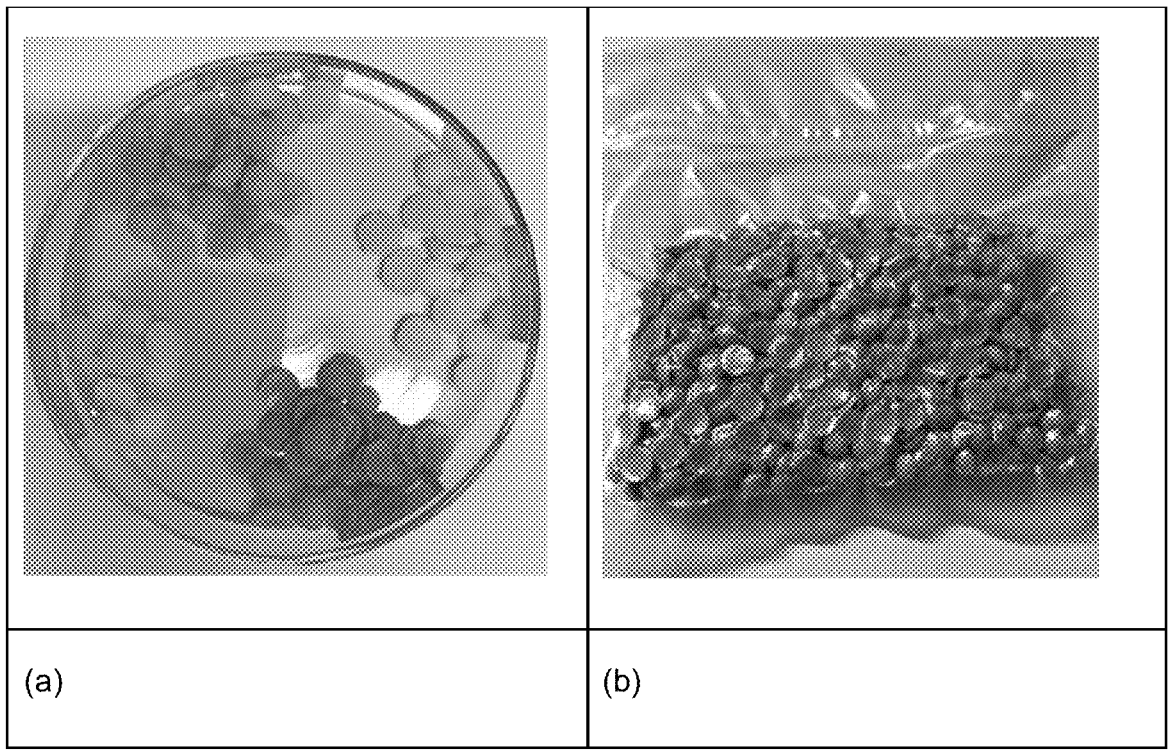
(a)            (b)

NPK LIQUID AND SOLID FERTILIZER, OBTAINING PROCESS, FERTILIZING COMPOSITIONS AND USE

CROSS REFERENCE TO RELATED APPLICATION

This Application is a 371 of PCT/IB2020/058058 filed on Aug. 28, 2020 which, in turn, claimed the priority of Brazilian Patent Application No. BR1020190209704 filed on Oct. 4, 2019, both applications are incorporated herein by reference.

The present technology consists of a process of chemical cleavage of leather or skin containing chromium. The process uses sodium, potassium or calcium methylates ($CH_3O^-$) or ethylates ($CH_3CH_2O^-$), producing chromium hydroxide (green paste), ammonium sulfate and liquid fertilizer. The chromium trioxide III ($Cr_2O_3$) obtained was used in the production of Fe—Cr alloy. The liquid fertilizer was applied to strawberry, violet and acerola crops, and can be applied to other types of crops. The fertilizer is also compatible with pesticides, being able to compose a composition containing fertilizer and pesticide or even used to obtain products containing fertilizers and pesticides, which allow application in a single step, exempting the process in the field. The invention also relates to obtaining a formulation of a solid NPK fertilizer, obtained in the form of pellets by combining N recovered from waste and homogeneously mixed with K and P salts. The pellets obtained in this way provide an interesting versatility of application in the field for the fertilizer, since in addition to the liquid fertilizer, a solid material can be produced, containing different compositions such as, for example, the 4/14/8 NPK formulation, for soil fertilization.

Class 1 industrial landfills are those responsible for accommodating hazardous and toxic waste, which cannot have contact with the ground or groundwater. The Brazilian environmental legislation is making it difficult or making the creation of new landfills more expensive, so there is a great demand for the vacating of Class 1 industrial landfills, in order to free up space for the reception of new hazardous waste. Thus, the present technology intends to avoid the need to create new landfills and, mainly, to transform the hazardous waste present in these landfills into products with added value.

The state of the art presents technologies to produce fertilizer from organic matter. The patent BR 102015028735-6, entitled "Processo de obtenção de base organomineral liquida para fertilizante foliar e produto obtido", from 2015, describes a process for producing a liquid fertilizer for foliar fertilizers from soybean molasses. The patent BR 102015019187-1 ("Desenvolvimento de fertilizante foliar organico"), also from 2015, relates to the development of fertilizers for foliar application using maceration water from corn.

There are still some technologies in the state of the art that use tailings from the leather industry as raw material. The patent PI 0701001-0 entitled "Máquina geradora de processo de transformação de aparas e descarte de couro em hidrolisado de couro e processo de transformação de aparas e Descartes de couro in natura ou curtido em adubo orgânico", from 2007, describes a spherical machine for controlled generation of a gelatinous paste obtained from the cooking of leather trimmings, generating organic fertilizer from hydrolyzed bovine leather trimmings, tanned to chromium III. The patent BR 102016011859-0, entitled "Processo de fabricação de fertilizante orgânico è base de aminoácidos de origem de proteina dérmica animal", from 2016, relates to the production of fertilizer using the hydrolysis of skins that have not undergone chrome tanning.

The patent BR 102013014252-2 ("Processo para obtenção de proteina liquida através do tratamento quimico de rejeitos de couro wet blue, semiacabado e acabado via hidrólise"), from 2013, reports a process for obtaining liquid protein by treating wet blue leather tailings, semi-finished and finished leather, using organic acids (oxalic, acetic, formic acid formulations) as a hydrolysing agent, being a different synthesis route than the required patent. The products obtained are (i) protein with a high nitrogen content with potential for use as foliar fertilizer or for fertigation; (ii) mixed mineral fluid fertilizer by adding minerals to the liquid protein (ii) hydrolyzed collagen with potential use as a cosmetic. The invention proposes the reuse of the products generated in this treatment (wet blue, semi-finished and finished leathers), through the recovery of chromium so that it can be used in new tanning processes. The products generated in this technology differ from the present invention, since it is not related to the use to obtain commercial Fe—Cr alloys, it does not produce ammonium sulfate and it does not use liquid fertilizer to formulate solid fertilizers with varied NPK combinations for soil fertilization. In addition, it does not report compatibility with pesticides for application in a single step in the field, which would lead to a decrease in the cost of application. Finally, the form of hydrolysis is different insofar as they use reagents of different natures, which requires carrying out the operation in two stages, that is, using one group of reagents for hydrolysis and another for chromium precipitation and then allowing its separation from the foliar fertilizer. In the present invention, these two steps take place simultaneously, employing a single group of hydrolysis reagents, significantly reducing the costs of the process and making its application on an industrial scale more feasible.

The patent PI 0402905-4, entitled "Processo de reciclagem dos residuos sólidos de curtumes por extração do cromo e recuperação do couro contaminado", from 2004, is characterized by the extraction of chromium (III) present in sawdust, scraps and shavings of chrome-tanned leather, through a synthesis route using a low-cost complexing agent and mild extraction conditions, obtaining a collagen-rich solid that can be used in the food industry, glue or as fertilizers. This solid also showed a high capacity to remove organic and inorganic substances from aqueous affluent and other media. In addition, the compound formed by chromium and the complexing agent (Cr(III)-complexing agent) was separated by the addition of sulfuric acid, which allowed the regeneration of the complexing agent and chromium sulfate, which can be reused in the tanning process. This technology differs from the present invention in that it employs different reagents, that is, compounds based on complexing agents to remove chromium and does not produce liquid fertilizer. Since the remaining chromium content, described in the patent, can promote accumulation in plants and soils. In addition, drying the solid collagen obtained should make its use on a commercial scale unfeasible due to the high energy cost required.

The technology of PI 1100438-0, "Processo para obtenção de proteina e sal de cromo através do tratamento quimico de rejeitos de couro curtidos ao cromo por reações em contracorrente" relates to the treatment of wet blue leather tailings, semi-finished and finished leather, and obtaining protein with potential for use as a slow-release fertilizer of N and chromium hydroxide which, through a second chemical treatment with sulfuric acid, is transformed into basic chromium sulfate to be applied as a tanning agent. The process uses formulations of complexing agents (solutions of oxalic acid and sodium hydroxide or potassium or calcium hydroxide or commercial oxalate salts) to promote the removal of chromium which is obtained in the form of tanning salt and to obtain a protein material rich in nitrogen in organic form to be used as a component of fertilizers. The technology described in the state of the art employs organic acids in the hydrolysis, requiring another step and a new set of reagents to precipitate chromium and its subsequent separation from the fertilizer. In addition, it employs the countercurrent technique.

The patent PI 1000015-1, entitled "Reciclagem de rejeitos de couro contend cromo: incorporação de fósforo e potássio para a produção de um fertilizante NPK com liberação lenta de macronutrients após a reitrada do cromo", from 2010, together with the article entitled "Incorporation of mineral phosphorus and potassium on leather waste (collagen): A new $N_{collagen}$PK-fertilizer with slow release", also from 2010, relates to a route to obtain a solid, non-foliar fertilizer enriched with P and K minerals (NOGUEIRA, F. G, E., PRATO, N. T., OLIVEIRA L. A., BASTOSA A. R. R., LOPES J. L., CARVALHO J. G., Journal of Hazardous Materials, volume 176, 2010, 374 to 380). These prior art documents employ complexing agents to partially remove the chromium, without promoting the hydrolysis of the leather. The fertilizer obtained in the description is obtained in solid form and does not allow incorporation of K and P to obtain different formulations, such as 4/14/8, as it is limited to the adsorption capacity of the solid protein obtained. In addition, it requires drying the solid protein, demanding high energy costs, and making its application on commercial scales unfeasible.

The patent CN 108409452, entitled "Preparation method for preparing foliar fertilizer raw material from leather making chromium containing leather meal", relates to a synthesis route that uses an inorganic base in the presence of sodium and steps of addition of expensive reagents such as 3-isocyanatopropyltriethoxysilane and aluminum diethylphosphinate, to produce a fertilizer for foliar use.

The document entitled "Remoção e recuperação de nitrogênio amoniacal de efluente Gerado no processamento do couro", from 2015, reports the use of nitrogen present in the liquid effluent discarded after the tanning process (FILHO. P. K. T. Universidade Tecnológica Federal do Paraná, Londrina, 2015).

The technologies reported in the state of the art use other sources of fertilizer generation (raw materials), different chemical reagents, costly processes and different routes. The present invention consists of a process of chemical cleavage of skins or leather containing chromium in products used in the industry: (i) liquid fertilizer with affinity for pesticides/herbicide/fungicide; (ii) ammonium sulfate; (iii) solid fertilizer with varied NPK formulation, mainly the 4/14/8 combination and (iv) $Cr_2O_3$ to be used in the production of Fe—Cr alloy. The liquid fertilizer and the solid NPK combination were applied to eucalyptus, rice, strawberry, violet and acerola crops, and can be applied to other types of crops. The liquid fertilizer showed compatibility with pesticides, and the two compounds could be applied in a single step, exempting the process in the field. The reagents involved in leather cleavage, not described in the state of the art, are methylates ($CH_3O^-Na^+$) and ethylates ($CH_3CH_2O^-Na^+$), which may be potassium or calcium. Reagents can be formed in situ by the addition of methanol/ethanol and sources of sodium, potassium or calcium. The organic metallic bases in this reaction type have a high capacity to increase the basicity of the medium, and the reaction can be carried out under mild conditions of time and temperature, which is not possible through the technologies described in the state of the art. Sodium methylate is a widely used and low-cost commercial product, which would make the invention viable to be carried out on a commercial scale. The scale up of the process was performed for 100 kg of leather/skin and the same results were observed for the bench data.

An innovative aspect of this technology is the use of a commercial reagent with great power to raise the basicity of aqueous solutions by forming the organic base methylate ($CH_3O^-$) or ethylate ($CH_3CH_2O^-$), which promotes the cleavage of the proteins present in the skin and leather. This reagent, in addition to having a low cost, has a high hydrolysis effect due to its strong basicity, which allows its use on an industrial scale since the reaction can be carried out in short times with low reaction temperature. In addition, as it is an organic base, it produces a unique foliar fertilizer, promoting an increase in the carbon content of the final material. It is important to emphasize that it allows the hydrolysis and precipitation of chromium in a single step, due to the basicity of the reagent and that the volatility of the organic bases allows its separation and reuse with less energy expenditure.

The production of ammonium sulfate by the process of the present technology releases ammonia in the gaseous form ($NH_3$) during the cleavage of the skin or leather, this ammonia is retained in a container containing sulfuric acid ($H_2SO_4$), which after the reaction with the ammonia released occurs in the form of ammonium sulfate [$(NH_4)_2SO_4$], a commercial fertilizer with high added value. Still by the same process, potassium or calcium sulfate can be obtained as another product suitable for commercialization. The product generated is compatible with pesticides and can be used to carry these products during foliar fertilization. This reduces the number of steps needed in the crop field, which relieves the fertilization process. NPK formulations were obtained in an unprecedented way by mixing the liquid fertilizer, an organic nitrogen source, with K and P salts to obtain the 4/14/8 NPK combination. Due to the organic nature of the N source, an NPK solid fertilizer with special properties of slow release of these nutrients was obtained. The versatility of the used reagents and the products obtained in the present invention makes this technology with high potential for application on a commercial scale, as it can be used for fertilization in liquid form in leaves and in different NPK combinations in solid form to fertilize soils. This allows replacing urea, a reagent of fossil origin, in solid NPK formulations.

Given this scenario, the recovery of chromium precipitate and transformation into material of commercial interest, adds value to the waste and also reduces the expenses with its destination, since it would no longer be destined for industrial landfills. The chromium obtained, in the form of chromium trioxide III ($Cr_2O_3$) can still be treated in order to be used as a source of this chemical element in the production of special steels from the Fe—Cr alloy.

BRIEF DESCRIPTION OF THE FIGURES

FIG. 1 (A) presents the photograph of the NPK solid fertilizer obtained in the form of pellets with different ratios of the elements (a) and the 4/14/8 formulation (b).

DETAILED DESCRIPTION OF THE TECHNOLOGY

The present technology consists of a process of chemical cleavage of leather or skins containing chromium. The process uses sodium, potassium or calcium methylates ($CH_3O^-$) or ethylates ($CH_3CH_2O_-$), producing chromium trioxide, ammonium sulfate, solid NPK fertilizer and liquid fertilizer rich in organic nitrogen. The chromium trioxide obtained was used in the production of the Fe—Cr alloy. Liquid fertilizer and solid fertilizer with the 4/14/8 NPK formulation were applied to strawberry, violet and acerola crops, and can be applied to other types of crops. The liquid fertilizer also showed compatibility with pesticides, which allows application in single steps, significantly relieving the process in the field. The process of obtaining fertilizer consists of the chemical cleavage of skin and leather, which may come from urban mining from industrial landfills or from tanneries. The process produces, in addition to liquid and solid fertilizers with NPK formulation, ammonium sulfate and chromium trioxide.

The process of obtaining fertilizer of the present invention comprises the following steps:
a. preparing the methylate or ethylate solution, in the concentration range between 0.01 and 1 mol/L;
b. heating the solution obtained in step "a" between 50 and 100° C.;
c. adding wet blue leather or skin in a leather/reagent/water ratio between 0.1:0.05:0.1 and 1:0.1:1, preferably in a ratio of 1:0.1:1;
d. carrying out the cleavage reaction for 30 to 60 minutes;
e. neutralizing using nitric or sulfuric or phosphoric acid at a concentration of 1 to 5 mol/L.

In step "a" the ethylate or methylate can have as counter ion sodium, potassium or calcium. Still, the solution can be prepared in situ, adding sodium or potassium or calcium hydroxide and methanol or ethanol to obtain methylate or ethylate between the ratios of 0.1/0.1 and 1/1 of methylate/ion, preferably of 1:1.

Through the process described, a solid 4/14/8 NPK fertilizer is obtained by combining the liquid fertilizer obtained in step "e" of the process described above and inorganic salts of K and P.

The retention of the generated ammonia can be carried out in a container containing sulfuric acid with a concentration of 10 to 20% by mass during 30 to 60 minutes of reaction, thus, forming ammonium sulfate.

The aforementioned process is capable of forming chromium trioxide that can be used directly as a source of chromium for the production of Fe—Cr alloy.

The liquid fertilizer obtained from the present invention is compatible with pesticides, herbicides and fungicides in any ratio.

The fertilizer compositions of the present invention contain the fertilizer defined above and a pesticide in any ratio, and can be applied in a single step.

Liquid fertilizer can be used to obtain products containing fertilizers and pesticides in any ratio for single step during fertilization.

The present invention is better understood according to the examples described below.

Example 1—Cleavage of Leather and Skin Using Methylates or Ethylates as Catalysts The catalysts of the cleavage processes used were sodium methylate, and sodium ethylate, calcium methylate or ethylate or potassium methylate or ethylate can be used. To cleave 100 g of wet blue leather or skin, a solution containing one of the reagents described above was used at a concentration of 1 mL of the reagent in 100 mL of water. It is important, for the proper functioning of the cleavage reaction, that the step is started by heating the reagent between 50 and 100° C. and only then adding the leather. This sequence facilitates the cleavage step, not requiring an increase in temperature, which promotes savings in the cost of the process. The reaction takes place almost instantaneously due to the basic strength of the cleavage agents. However, to ensure complete cleavage, the reaction was run for 30 minutes. In order to reduce the cost of the process, reagents prepared at the time of the reaction were also tested, adding sodium hydroxide and methanol or ethanol, in order to produce the methylate or ethylate in situ. Efficiency was the same when using commercially purchased reagents. After the reaction catalyzed by methylate or ethylate, the following products were obtained: dense liquid fertilizer; concentrated ammonium sulfate, which was recovered by bubbling the ammonia generated in the cleavage into a vessel containing dilute sulfuric acid; K or Ca sulfate formed in the concentration of the foliar fertilizer; chromium trioxide ($Cr_2O_3$). With the total separation of chromium, the obtained liquid fertilizer rich in nitrogen and carbon in the form of amino acids presented the appearance of a brown liquid. Liquid fertilizer was used to produce NPK pellets by reacting with K and P salts (FIG. 1).

Example 2—Study of Compatibility with Pesticides and Fertilizing Action of the Leather and Skin Cleavage Product For use as a fertilizer and pesticide carrier (atrazine), the material produced from the cleavage of the leather was characterized as to its composition, with a carbon content of 28% and a nitrogen content of 11% by mass. The main amino acids present were glycine, proline, alanine and glutamic acid.

To add to the cultures tested, 5 mL was diluted in 500 mL of water. After 65 days of experiment in tests with violet, strawberry and acerola, the results were very promising, with a strong effect in the sample that was fertilized weekly, compared to the control experiment, without foliar fertilization. Topdressing fertilization was performed according to plant development, divided into three applications of N and K with 50 mg $dm^{-3}$ per application. Initially, the sowing of cultures was carried out. After 14 days, thinning was carried out in the experiment. For all crops, agronomic gain was observed both for cases where no foliar fertilizer was added or for cases where urea was used as a source of foliar N.

The action observed in different cultures suggests that the material has great versatility and can be used in ornamental plants, fruits and arboreal plants, with a good possibility of being used in eucalyptus and others. The solid material, NPK pellets, still allow for soil fertilization.

Example 3—Scale Up Study of the Leather and Skin Cleavage Process

The process was validated on a pilot scale, using 100 kg of wet blue leather shavings, showing the same efficiency as the procedure performed with 100 g on a bench scale (example 1), which allowed for more realistic process costs with the increase in scale. The process proved to be perfectly possible to be transformed on an industrial scale, since the parameters obtained in the bench tests were reproduced on this larger scale.

Example 4—Use of Chromium Trioxide to Produce Fe—Cr Alloy

Stainless steels are alloys containing iron (Fe), carbon (C) and chromium (Cr) with at least 10.50% Cr by mass. Other metallic elements are also part of these alloys, but Cr is considered the most important element because it is what gives stainless steels high corrosion resistance. In order to carry out the test in an electric furnace, a melting bed similar to those performed in steel mills was prepared, but using recovered chromium, described in the present invention, as raw material. Experimental runs were performed using the chromium obtained. The tests showed that it is technically feasible to obtain the Fe—Cr alloy. The analysis of the alloy obtained indicates that the contents found are close to the expected values for this type of material, that is, Fe, Cr and C contents of 37, 58 and 6% by mass, respectively.

The invention claimed is:

1. A process for producing a fertilizer comprising:
    a) preparing a methoxide or ethoxide solution, in a concentration range between 0.01 and 1 mol/L;
    b) heating the solution obtained in step a) between 5° and 100° C.;
    c) adding wet blue leather or skin in a wet blue leather or skin/methoxide or ethoxide/water ratio between 0.1:0.05:0.1 and 1:0.1:1 to obtain a product;
    d) submitting the product obtained in step c) to a cleavage reaction for 30 to 60 minutes to obtain a dense liquid fertilizer, ammonia, and chromium trioxide;
    e) submitting the ammonia obtained in step d) to a neutralization reaction using nitric or sulfuric or phosphoric acid at a concentration of 1 to 5 mol/L to obtain ammonium sulfate.

2. The process for producing a fertilizer according to claim 1, wherein the methoxide or ethoxide solution has sodium, potassium or calcium as counter ion.

3. The process for producing a fertilizer according to claim 1, wherein the methoxide or ethoxide solution is prepared in situ, adding sodium or potassium or calcium hydroxide and methanol or ethanol to form the methoxide or ethoxide between 0.1/0.1 and 1/1 methoxide/cation ratios.

4. The process for producing a fertilizer according to claim 1, further comprising obtaining a solid 4/14/8 NPK fertilizer by combining the liquid fertilizer obtained in step e) with inorganic salts of K and P.

5. The process for producing a fertilizer according to claim 1, wherein, in step e), the ammonia generated in step d) is retained in a container containing sulfuric acid, wherein the sulfuric acid has a concentration of 10 to 20% by mass for 30 to 60 min, forming ammonium sulfate.

6. A fertilizing composition containing the fertilizer obtained in the process as defined in claim 1 and a pesticide.

* * * * *